United States Patent
Kiribuchi et al.

(10) Patent No.: US 10,579,813 B2
(45) Date of Patent: Mar. 3, 2020

(54) DATABASE SYSTEM AND DATABASE PROCESSING METHOD

(71) Applicant: NIPPON TELEGRAPH AND TELEPHONE CORPORATION, Chiyoda-ku (JP)

(72) Inventors: Naoto Kiribuchi, Musashino (JP); Hiroyoshi Takiguchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/570,445

(22) PCT Filed: May 6, 2016

(86) PCT No.: PCT/JP2016/063662
§ 371 (c)(1),
(2) Date: Oct. 30, 2017

(87) PCT Pub. No.: WO2016/181904
PCT Pub. Date: Nov. 17, 2016

(65) Prior Publication Data
US 2018/0150642 A1    May 31, 2018

(30) Foreign Application Priority Data

May 14, 2015 (JP) ................................ 2015-099204

(51) Int. Cl.
*G06F 21/00* (2013.01)
*G06F 21/62* (2013.01)
(Continued)

(52) U.S. Cl.
CPC .......... *G06F 21/6218* (2013.01); *G06F 16/00* (2019.01); *G06F 16/21* (2019.01);
(Continued)

(58) Field of Classification Search
CPC ...... G06F 21/6218; G06F 16/21; G06F 16/27; G06F 16/00; G06F 21/6227; G09C 1/00
See application file for complete search history.

(56) References Cited

U.S. PATENT DOCUMENTS

| 7,376,830 B2 * | 5/2008 | Sethi ................... H04L 63/0464 |
| | | 370/351 |
| 8,812,877 B2 * | 8/2014 | Mori ......................... H04L 9/14 |
| | | 713/193 |

(Continued)

FOREIGN PATENT DOCUMENTS

JP    2009-180912 A    8/2009
JP    2009-187339 A    8/2009

OTHER PUBLICATIONS

Office Action dated Nov. 20, 2018 in Japanese Patent Application No. 2017-517915 (with English translation).

(Continued)

*Primary Examiner* — Ghodrat Jamshidi
(74) *Attorney, Agent, or Firm* — Oblon, McClelland, Maier & Neustadt, L.L.P.

(57) ABSTRACT

A database system comprises a determining part 13 determining whether or not to conceal information to be registered in a database, a terminal device 1 that, if the determining part 13 determines that the information is to be concealed, generates N information fragments by secret-sharing the information and sends the N information fragments to a system management device 2, where N is a predetermined positive integer, the system management device 2 sending the N information fragments received from the terminal device 1 to N different database devices 3, and N database devices 3 each storing one of N information fragments received from the system management device 2.

3 Claims, 3 Drawing Sheets

(51) Int. Cl.
  *G06F 16/21*  (2019.01)
  *G06F 16/27*  (2019.01)
  *G09C 1/00*  (2006.01)
  *G06F 16/00*  (2019.01)
(52) U.S. Cl.
  CPC .......... *G06F 16/27* (2019.01); *G06F 21/6227* (2013.01); *G09C 1/00* (2013.01)

(56) References Cited

U.S. PATENT DOCUMENTS

| | | | |
|---|---|---|---|
| 9,483,656 B2* | 11/2016 | Leggette | G06F 21/6227 |
| 10,067,969 B2* | 9/2018 | Rice | G06F 16/27 |
| 2005/0114659 A1* | 5/2005 | Klein | G06F 21/80 713/165 |
| 2005/0216754 A1 | 9/2005 | Ehud | |
| 2012/0078914 A1* | 3/2012 | Roeder | H04L 9/00 707/741 |
| 2012/0185946 A1* | 7/2012 | Kamara | G06F 9/5072 726/26 |
| 2012/0297201 A1* | 11/2012 | Matsuda | G06F 21/6245 713/189 |
| 2013/0036059 A1* | 2/2013 | Oura | G06F 21/6218 705/71 |
| 2013/0067012 A1* | 3/2013 | Matzkel | H04L 63/0428 709/206 |
| 2014/0281589 A1* | 9/2014 | Bain | G06F 21/6218 713/193 |
| 2015/0039882 A1* | 2/2015 | Watanabe | H04L 63/0428 713/153 |
| 2015/0039901 A1* | 2/2015 | Freeman | G06F 21/602 713/189 |
| 2015/0143112 A1* | 5/2015 | Yavuz | G06F 21/6227 713/165 |

OTHER PUBLICATIONS

Extended European Search Report dated Nov. 23, 2018 in Patent Application No. 16792629.4, 8 pages.
Agrawal, D. et al. "Database Management as a Service: Challenges and Opportunities" IEEE International Conference on Data Engineering, XP031447900, 2009, pp. 1709-1716.
International Search Report dated Jul. 12, 2016, in PCT/JP2016/063662, filed May 6, 2016.
Minakami, Syota, et al., "Design and Implementation of Secret Sharing Distributed Database System", IEICE Technical Report, vol. 108, No. 405, Jan. 22, 2009, pp. 51-56, with English abstract.
Oracle Advanced Security, http://www.oracle.com/jp/products/database/options/advanced-security/overview/index.html, retrieved May 1, 2015, with corresponding English Version.
Song, Dawn X., et al., "Practical Techniques for Searches on Encrypted Data", IEEE Symposium on Security and Privacy, 2000, (12 pages).
Gentry, Craig, "Fully Homomorphic Encryption Using Ideal Lattices", STOC '09, 2009, pp. 169-178.
Shamir, Adi, "How to Share a Secret", Communications of the ACM, vol. 22, No. 11, Nov. 1979, pp. 612-613.
Gennaro, Rosario, et al., "Simplified VSS and Fast-track Multiparty Computations with Applications to Threshold Cryptography", 17th annual ACM symposium on Principles of distributed computing, 1998, pp. 101-111.
Office Action dated Aug. 21, 2019 in European Application No. 16 792 629.4.
Office Action dated Jan. 2, 2020 in Chinese Application No. 201680025992.0 (w/English translation).

* cited by examiner

DATABASE SYSTEM AND DATABASE PROCESSING METHOD

TECHNICAL FIELD

The present invention relates to an applied encryption technique and, in particular, to a secure computation technique that performs information processing without revealing data stored in a database.

BACKGROUND ART

There are known methods for concealing data to be stored in a database, including, among others: (1) cryptography using transparent encryption, (2) cryptography using searchable encryption and the like, and (3) cryptography using fully homomorphic encryption.

(1) Transparent encryption conceals data stored in a database by encrypting the data before storing the data in the database (for example, see Non-patent literature 1).

(2) Cryptography using searchable encryption and the like performs certain processing on ciphertexts to allow data to be searched for or to be subjected to manipulations that depend on encryption schemes while the data is kept concealed (for example, see Non-patent literature 2).

(3) Cryptography using fully homomorphic encryption performs arbitrary processing on data to allow the data to be manipulated while the data is kept concealed (for example, see Non-patent literature 3).

PRIOR ART LITERATURE

Non-Patent Literature

Non-patent literature 1: Oracle Advanced Security, [online], [retrieved on May 1, 2015], Internet URL: http://www.oracle.com/jp/products/database/options/advanced-security/overview/index.html Non-patent literature 2: D. X. Song, D. Wagner, and A. Perring, "Practical Techniques for Searches on Encrypted Data," in IEEE Symposium on Security and Privacy, pages 44-55, 2000.

Non-patent literature 3: C. Gentry, "Fully Homomorphic Encryption Using Ideal Lattices," in STOC '09, pages 169-178, 2009.

SUMMARY OF THE INVENTION

Problems to be Solved by the Invention

All of the approaches (1) to (3) cited above use encryption keys and therefore have the risk of leakage of the encryption keys.

An object of the present invention is to provide a database system and a database processing method that do not have the risk of encryption key leakage.

Means to Solve the Problems

A database system according to one aspect of the present invention comprises a determining part determining whether or not to conceal information to be registered in a database, a terminal device that, if the determining part determines that the information is to be concealed, generates N information fragments, where N is a predetermined positive integer, by secret-sharing the information and sends the N information fragments to a system management device, the system management device sending the N information fragments received from the terminal device to N different database devices, and the N database devices each storing respective one of N information fragments received from the system management device.

Effects of the Invention

The risk of encryption key leakage is eliminated because no encryption key is used.

DETAILED DESCRIPTION OF THE EMBODIMENTS

Figure 1:
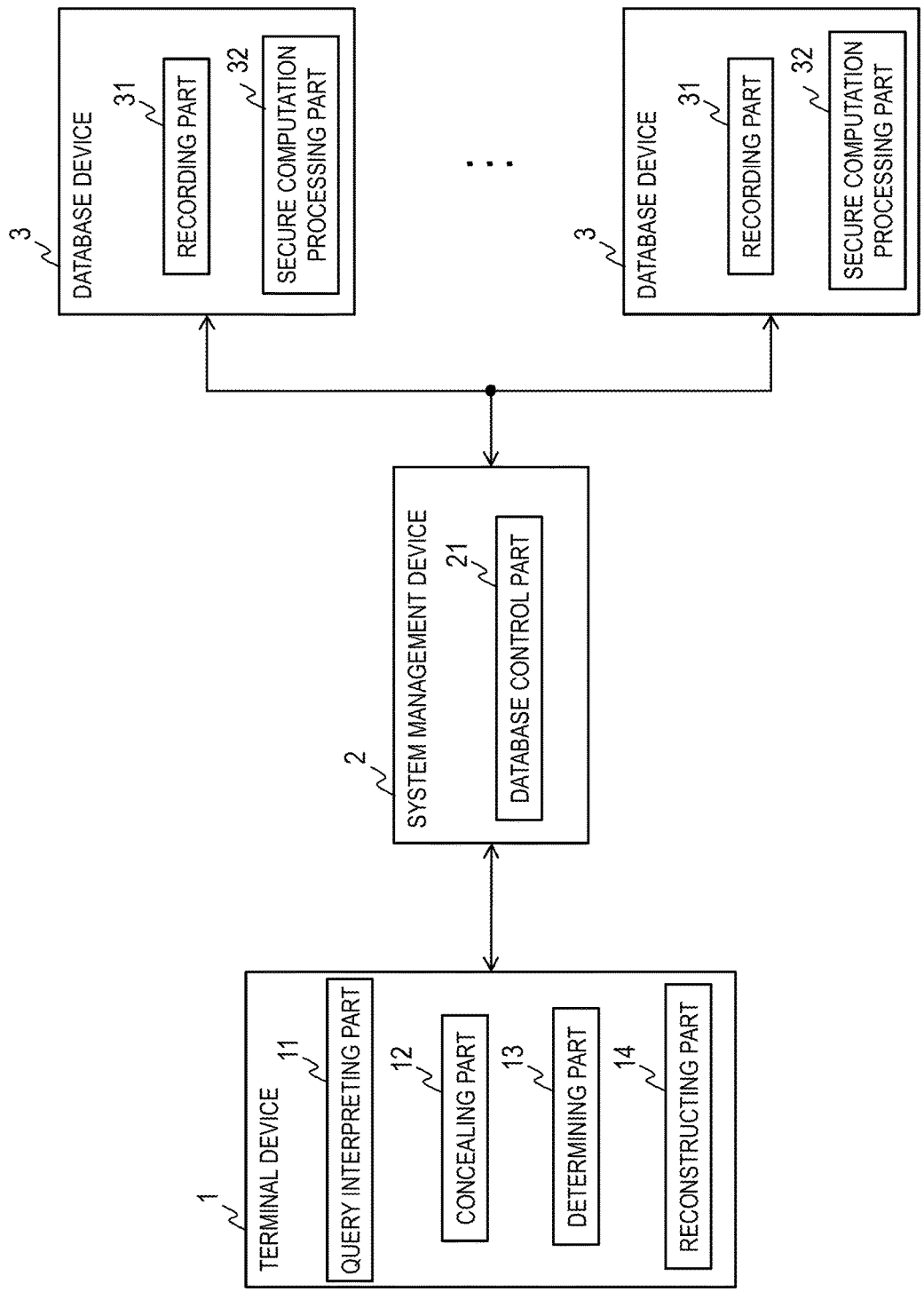
FIG. 1 is a block diagram for illustrating an example of a database system.

A database system comprises a terminal device 1, a system management device 2 and N database devices 3, for example, as illustrated in FIG. 1.

The terminal device 1 is an information terminal such as a mobile phone, a smartphone or a PC. The terminal device 1 comprises a query interpreting part 11, a concealing part 12, a determining part 13, and a reconstructing part 14, for example. While only one terminal device 1 is depicted in the example in FIG. 1, a plurality of different terminal devices 1 may be connected to the system management device 2 in a manner that they can communicate with one another.

The system management device 2 is a server for managing the database system, as will be described later. The system management device 2 comprises a database control part 21, for example.

The database devices 3 are devices that store fragments that are secret-shared as will be described later, and reconstruct information by secure computation as needed. Each of the database devices 3 comprises a recording part 31 and a secure computation processing part 32, for example.

Secret sharing is a technique that conceals input data by transforming the data into a plurality (N) of fragments and isolating the fragments of data from one another. Here, N is a predetermined positive integer. Since the knowledge of the original data can be gained only if K fragments (K is a positive integer less than or equal to N) are collected and no encryption key is used, the risk of information leakage due to compromise of security is eliminated (for example, see Reference literature 1).

Reference literature 1: A. Shamir, "How to Share a Secret," Communications of the ACM 22, pages 612-613, 1979.

Secure computation is a technique that uses C fragments (C is a positive integer greater between K, inclusive, and N, inclusive) concealed by secret sharing to perform a process without revealing the original data. It is known that theoretically any function can be computed. In Reference literature 2 given below illustrates a method of multiplication which is a basic computation.

Reference literature 2: R. Gennaro, M. O. Rabin, and T. Rabin, "Simplified VSS and Fast-track Multiparty Computations with Applications to Threshold Cryptography," 17th annual ACM symposium on Principles of distributed computing, ACM, 1998.

A manipulation on a database is input from the terminal device 1, passes through the system management device 2, and is executed at each database device 3. As in a conventional database, data processes on the database include six main processes, which are: 1. table definition, 2. data registration, 3. data search, 4. data update, 5. data deletion, and 6. table deletion. The processes will be described below.

[Table Definition]

Table definition is a manipulation of defining a table for storing data.

When the query interpreting part 11 determines that a query (for example an SQL statement) input into the terminal device 1 is a "table definition" process, the terminal device 1 sends information about a table to be created, such as a table name and attributes of columns of the table, to the system management device 2.

The system management device 2 causes the database control part 21 to send information about the table to be created to the N database devices.

Each of the database devices 3 records the information about the table to be created in the recording part 31 and returns a completion notice to the system management device 2.

The system management device 2 makes certain that the completion notices have been properly received from the N database devices and notifies the terminal device 1 that the "table definition" process has been properly completed.

The terminal device 1 causes the query interpreting part 11 to provide a response corresponding to the input query to a user.

[Data Registration]

Data registration is a manipulation of storing data.

When the query interpreting part 11 determines that a query (for example an SQL statement) input into the terminal device 1 is a "data registration" process, the terminal device 1 sends a table name of a table in which data is to be registered to the system management device 2.

The system management device 2 acquires table information which is information about a table of interest from at least one database device 3 and returns the information to the terminal device 1.

The determining part 13 of the terminal device 1 determines, from the returned information, a column to be concealed. That is, the determining part 13 determines whether or not to conceal information to be registered in a database (step A1 of FIG. 2).

Information determined to be concealed, in other words, information to be registered in a concealed column, is secret-shared at the concealing part 12 of the terminal device 1. The terminal device 1 sends information transformed into fragments by the secret-sharing to the system management device 2 along with plaintext information to be stored in an unconcealed column which is information that has not been determined to be concealed.

Figure 2:
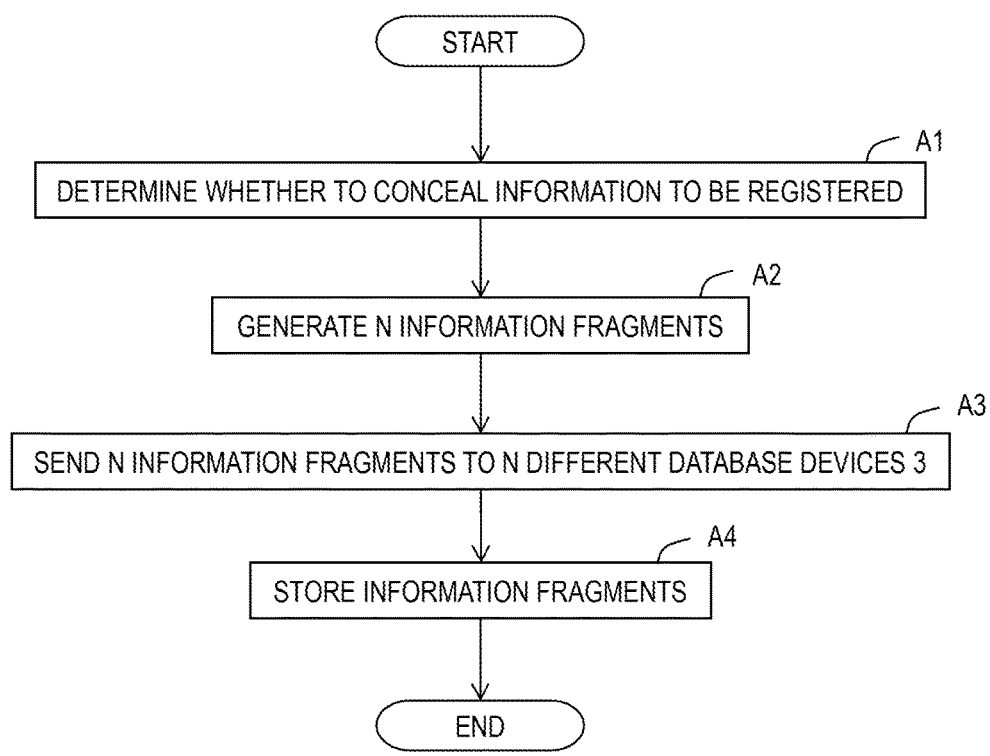
FIG. 2 is a flowchart for illustrating an example of a process of registering data.

In this way, when the determining part 13 determines to conceal, the concealing part 12 of the terminal device 1 generates N information fragments by secret-sharing the information to be concealed and sends the N information fragments to the system management device (step A2 of FIG. 2). Each of the N information fragments are associated with one of the N of the database devices 3.

The system management device 2 sends the N information fragments received from the terminal device 1 to the N different database devices 3 (step A3 of FIG. 2). Specifically, the system management device 2 causes the database control part 21 to send information such as a table name required for the "data registration" process, plaintext/data fragments to be registered to the N database devices 3.

Each of the database devices 3 stores its respective one of the N information fragments received from the management device 2 (step A4 of FIG. 2). Specifically, each of the database devices 3 records in the recording part 31 an information fragment to be registered and returns a completion notice to the system management device.

The system management device 2 makes certain that the completion notices have been properly received from the N database devices 3 and notifies the terminal device 1 that the "date registration" process has been properly completed.

The terminal device 1 causes the query interpreting part 11 to provide a response corresponding to the input query to the user.

[Data Search]

Data search is a manipulation of looking up data of interest in stored data.

When the query interpreting part 11 determines that a query (for example an SQL statement) input into the terminal device 1 is a "data search" process, the terminal device 1 sends a table name of a table to be searched for data to the system management device 2.

The system management device 2 acquires information about the table to be searched for the data from at least one database device 3 and returns the information to the terminal device 1.

The determining part 13 of the terminal device 1 determines whether or not to conceal all or part of a search condition for looking up in the database (step B1). Specifically, the determining part 13 determines, from the returned information, whether or not the "data search" process to be executed involves a secure computation process. For example, if IDs of people who are a certain year old and above are searched for, the age is concealed.

Further, the determining part 13 determines whether or not the information to be looked up in the database is concealed (step B2). For example, if a column to be searched includes a fragment, the determining part 13 determines that the information to be looked up in the database is concealed.

If the determining part 13 determines to conceal all or part of the search condition, the concealing part 12 of the terminal device 1 generates search information fragments by secret-sharing all or part of the search condition and sends the search information fragments to the system management device 2 (step B3). In this case, the determining part 13 may send to the system management device 2 information about a result of the determination as to whether or not to conceal all or part of the search condition for looking up in database and information about a result of the determination as to whether or not the information to be looked up in the database is concealed. C search information fragments are generated, where C is a positive integer between K, inclusive, and N, inclusive. Each of the search information fragments is associated with one of the database devices 3.

(1) If it is determined that all or part of the search condition for looking up in the database is to be concealed, that is, if the search information fragments have been generated by secret-sharing all or part of the search condition, the system management device 2 sends each of the C search information fragments to one of the database devices 3 that is associated with the search information fragment (step B4).

In this case, the C database devices 3 that have received C search information fragments find C information fragments that correspond to the C search information fragments by secure computations (step B5).

The system management device 2 sends K information fragments among the found C the information fragments to the terminal device 1 (step B6). For example, the system management device 2 receives the C information fragments from the C database devices 3 and sends K information fragments among the received C information fragments to the terminal device 1. Alternatively, the system management device 2 may select K database devices among the C database devices 3 on each of which one of the found C information fragments is stored, may receive K information fragments from the selected K database devices 3, and may send the received K information fragments to the terminal device 1.

The reconstructing part 14 of the terminal device 1 reconstructs the original information on the basis of the received K information fragments (step B7). Then the query interpreting part 11 of the terminal device 1 provides a response corresponding to the input query to the user.

(2) If it is not determined that all or part of the search condition for looking up the database is to be concealed and it is determined that the information to be looked up in the database is concealed, the system management device 2 retrieves K information fragments each of which is stored in one of K database devices 3 among the N database devices 3 and sends the K information fragments to the terminal device 1 (step B6). For example, the system management device 2 receives N information fragments from the N database devices 3 and sends K information fragments among the received N information fragments to the terminal device 1. Alternatively, the system management device 2 may select K database devices 3 from among the N database devices 3, may receive K information fragments from the selected K database devices 3, and may send the received K information fragments to the terminal device 1.

The reconstructing part 14 of the terminal device 1 reconstructs the original information on the basis of the received K information fragments (step B7). Then, the query interpreting part 11 of the terminal device 1 provides a response corresponding to the input query to the user.

Figure 3:
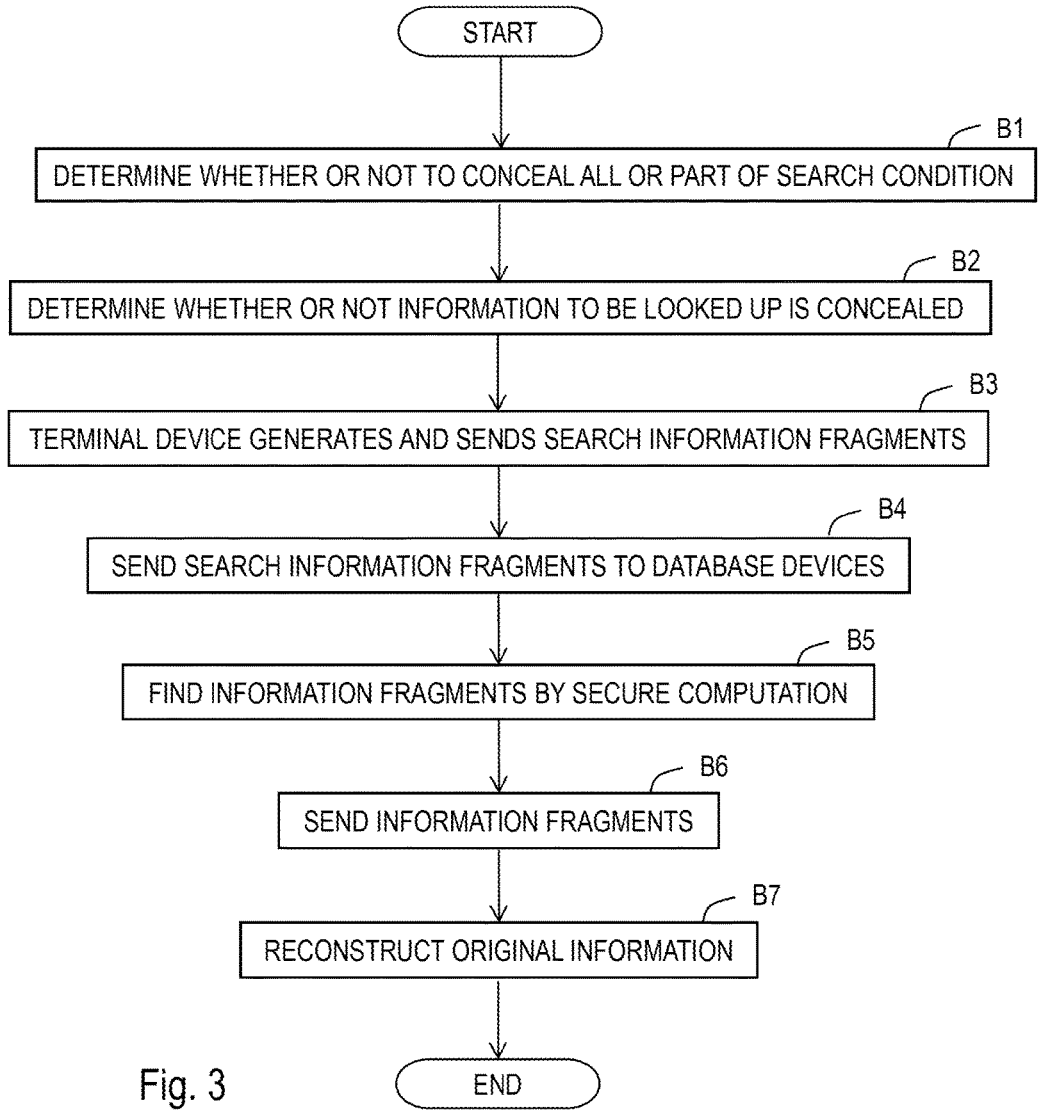
FIG. 3 is a flowchart for illustrating a process of data search.

In the case of (2), the process from step B3 to step B5 of FIG. 3 is not performed.

(3) If it is not determined that all or part of the search condition for looking up in the database is to be concealed and it is not determined that information to be look up in the database is concealed, the system management device 2 sends a search instruction to at least one database device 3.

The database device(s) 3 that has received the search instruction acquires information to be searched for from the recording part 31 and returns the result(s) of the search to the system management device 2.

The system management device 2 returns the result(s) from the database device(s) 3 to the terminal device 1.

Then, the query interpreting part 11 of the terminal device 1 provides a response corresponding to the input query to the user.

In the case of (3), the process from step B3 to step B7 of FIG. 3 is not performed.

[Data Update]

Data update is a manipulation of updating stored data of interest.

When the query interpreting part 11 determines that a query (for example an SQL statement) input into the terminal device 1 is a "data update" process, the terminal device 1 sends a table name of a table in which data is to be updated to the system management device 2.

The system management device 2 acquires information about the table to be updated from at least one database device 3 and returns the information to the terminal device 1.

The terminal device 1 determines, from the returned information, a column to be concealed and determines whether or not the "data update" process to be executed involves a secure computation process. Information to be stored in a concealed column is secret-shared by the concealing part 12 of the terminal device 1. Information transformed to information fragments by the secret-sharing, plaintext information to be stored in an unconcealed column, and information indicating whether or not a secure computation process is involved are sent to the system management device 2. For example, when private information to be concealed, such as a street address and a phone number, is to be updated with the private information kept being concealed, a secure computation is performed in the "data update" process.

The system management device 2 causes the database control part 21 to send information such as a table name required for the "data update" process and plaintext/secret data to be updated to the N database devices 3.

Only if a secure computation process is involved, each of the database devices 3 causes the secure computation processing part 32 to perform a secure computation, records the information updated in the recording part 31, and returns a completion notice to the system management device 2.

The system management device 2 makes certain that the completion notices have been properly received from the N database devices, and notifies the terminal device 1 that the "table update" process has been properly completed.

The terminal device 1 causes the query interpreting part 11 to provide a response corresponding to the input query to the user.

[Data Deletion]

Data deletion is a manipulation of deleting stored data of interest.

When the query interpreting part 11 determines that a query (for example an SQL statement) input into the terminal device 1 is a "data deletion" process, the terminal device 1 sends a table name of a table from which data is to be deleted to the system management device 2.

The system management device 2 acquires information about the table of interest from at least one database device 3 and returns the information to the terminal device 1.

The determining part 13 of the terminal device 1 determines, from the returned information, whether or not the "data deletion" process involves a secure computation process and the database control part 21 of the system management device 2 sends information such as a table name and a condition for deletion that is required for the "data deletion" process to the N database devices 3. For example, when information such as concealed IDs is to be deleted with the information being kept concealed, a secure computation process is performed in the "data deletion" process.

Only if a secure computation process is involved, each of the database devices 3 causes the secure computation processing part 32 to perform a secure computation process, deletes the information to be deleted from the recording part 31, and returns a completion notice to the system management device 2.

The system management device 2 makes certain that the completion notices have been properly received from the N database devices and notifies the terminal device 1 that the "data deletion" process has been properly completed.

The terminal device 1 causes the query interpreting part 11 to provide a response corresponding to the input query to the user.

[Table Deletion]

Table deletion is a manipulation of deleting a defined table of interest.

A query (for example an SQL statement) input into the terminal device 1 is determined to be a "table deletion" process by the query interpreting part 11 and a table name of a table to be deleted is sent to the system management device 2.

The system management device 2 causes the database control part 21 to send information required for the "table deletion" process, such as the table name, to the N database devices 3.

Each of the database devices 3 deletes information to be deleted from the recording part and returns a completion notice to the system management device 2.

The system management device 2 makes certain that the completion notices have been properly received from the N database devices 3 and notifies the terminal device 1 that the "table deletion" process has been properly completed.

The terminal device 1 causes the query interpreting part 11 to provide a response corresponding to the input query to the user.

[Modifications]

The query interpreting part 11 of the terminal device 1 may deal with commonly-used database manipulation instructions (for example, SQL statements). This enables the use of secure databases without modifying an external program that uses the database.

For example, if an external program exists on a conventional Web three-tier model system, manipulation instructions to a database are sent from an application server to a database server and therefore a secure database is made available by sending database manipulation instructions from the application server to the terminal device 1, without modifying the external program on the application server.

Further, an existing database device may be used as a database device 3. This can reduce costs.

Database functions can be classified as manipulations that involve secure computations and manipulations that do not involve secure computations. For example, search relating to concealed ages involves secure computations while search in which no condition is specified does not involve secure computations. Manipulations that do not involve secure computations are equivalent to manipulations on conventional databases and therefore can be processed by using relevant functions of existing databases without modifications. The secure computation processing part 32 needs to perform processing only when secure computations are involved. For example, the secure computation processing part 32 is called by an external function-call part provided in an existing database and executes processing.

This eliminates the need for providing programs for manipulations that do not involve secure computations because existing databases can be substituted for such programs. Consequently, the amount of programs of the whole invention can be reduced.

While the determining part 13 is provided in the terminal device 1 in the example described above, the determining part 13 may be provided outside the terminal device 1. For example, the determining part 13 may be provided in the system management device 2.

[Program and Recording Media]

The processes described in the descriptions of the database system and the database processing method may be performed not only in time sequence as is written but also performed in parallel or individually, depending on the processing capacity of the devices that perform the processes or requirements.

If processes performed at devices or parts that make up the database system are implemented by a computer, the specifics of the processes by functions that the devices or parts need to include are described by a program. The program is executed on the computer to implement the processes on the computer.

The program describing the specifics of the processes can be recorded on a computer-readable recording medium. The computer-readable recording medium may be any medium such as a magnetic recording device, an optical disc, a magneto-optical recording medium, and a semiconductor memory, for example.

Further, devices or parts may be configured by causing a computer to execute a given program as described above or at least part of the processes may be implemented by hardware.

It would be understood that other modifications can be made as appropriate without departing from the spirit of the present invention.

What is claimed is:

1. A database system comprising:
   processing circuitry configured to determine whether or not to conceal information to be registered in a database;
   a terminal device that, when the processing circuitry determines that the information is to be concealed, generates N information fragments by secret-sharing the information and sends the N information fragments to a system management device, where N is a predetermined positive integer;
   the system management device sending the N information fragments received from the terminal device to N different database devices; and
   the N database devices each storing respective one of N information fragments received from the system management device,
   wherein the processing circuitry determines whether or not to conceal all or part of a search condition for looking up in a database;
   when the processing circuitry determines to conceal all or part of the search condition, the terminal device generates C search information fragments by secret-sharing all or part of the search condition and sends the C search information fragments to the system management device, where C is a positive integer between K, inclusive, and N, inclusive;
   the system management device sends the C search information fragments received from the terminal device to C different database devices;
   the C database devices find C information fragments that correspond to the C search information fragments;
   the system management device sends K information fragments among the C information fragments to the terminal device; and
   the terminal device reconstructs original information on the basis of the received K information fragments.

2. A database system according to claim 1,
   wherein the processing circuitry determines whether or not information to be looked up in a database is concealed and, if the processing circuitry determines that the information is concealed, the system management device retrieves K information fragments stored in K different database devices among the N database devices and sends the K information fragments to the terminal device, where K is a predetermined positive integer less than or equal to N; and the terminal device reconstructs original information on the basis of the K information fragments received from the system management device.

3. A database processing method comprising the steps of:

determining, by processing circuitry, whether to conceal information to be registered in a database;

when the step of determining determines to conceal, generating, by a terminal device, N information fragments by secret-sharing the information, and sending the N information fragments to a system management device, where N is a predetermined positive integer;

sending, by the system management device, the N information fragments received from the terminal device to N different database devices; and storing, by the N database devices, the N information fragments received from the system management device, wherein the processing circuitry determines whether or not to conceal all or part of a search condition for looking up in a database;

when the processing circuitry determines to conceal all or part of the search condition, the terminal device generates C search information fragments by secret-sharing all or part of the search condition and sends the C search information fragments to the system management device, where C is a positive integer between K, inclusive, and N, inclusive;

the system management device sends the C search information fragments received from the terminal device to C different database devices;

the C database devices find C information fragments that correspond to the C search information fragments;

the system management device sends K information fragments among the C information fragments to the terminal device; and the terminal device reconstructs original information on the basis of the received K information fragments.

\* \* \* \* \*